United States Patent [19]
Carre

[11] 3,952,811
[45] Apr. 27, 1976

[54] ROCK CRUSHER

[76] Inventor: Francois Carre, 89730 Mailly-la-Ville, France

[22] Filed: Sept. 13, 1973

[21] Appl. No.: 396,850

[30] Foreign Application Priority Data

Sept. 5, 1973 France .............................. 73.32086

[52] U.S. Cl. ...................................... 172/45; 404/90
[51] Int. Cl.² ........................................... A01B 33/00
[58] Field of Search ................. 171/85, 63; 56/14.4, 56/DIG. 1; 404/90; 299/37, 26; 172/45

[56] References Cited

UNITED STATES PATENTS

| | | | |
|---|---|---|---|
| 2,357,374 | 9/1944 | Ariens | 404/90 |
| 2,539,136 | 1/1951 | Hite | 404/90 |
| 2,669,819 | 2/1954 | Sawyer | 172/45 |
| 2,693,746 | 11/1954 | Klein | 171/85 |
| 2,787,943 | 4/1957 | Browning | 404/90 |
| 2,972,384 | 2/1961 | Thome | 171/63 |
| 3,224,347 | 12/1965 | Seaman | 404/90 |
| 3,388,750 | 6/1968 | Hamm | 172/45 |
| 3,409,088 | 11/1968 | Lindbeck et al. | 404/90 |
| 3,599,405 | 8/1971 | Hurlburt | 56/14.4 |

FOREIGN PATENTS OR APPLICATIONS

| | | | |
|---|---|---|---|
| 214,275 | 4/1958 | Australia | 171/63 |

*Primary Examiner*—Louis G. Mancene
*Assistant Examiner*—James D. Hamilton
*Attorney, Agent, or Firm*—Brisebois & Kruger

[57] ABSTRACT

Rock crusher comprising a rotor on which hammers are pivotally mounted between claws or plowshares which are transversely aligned on a frame 1 mounted on two wheels, the height of which is adjustable. The crusher is provided with a drawbar (15) for attaching it to a tractor, and the rotor (4) is also mounted on the frame and connected to a longitudinal drive shaft carried by the drawbar (15). A coupling is provided to connect the rotor to a power takeoff carried by the tractor.

8 Claims, 8 Drawing Figures

ROCK CRUSHER

SUMMARY OF THE INVENTION

This invention relates to a rock crusher of moderate cost which may be drawn by a tractor of average power, which is capable of crushing rocks regardless of their hardness provided they are relatively small, and which, in response to local needs, permits partial crushing limited to the surface of the soil or more complete deeper working thereof.

It is an agricultural machine adapted to be attached to a tractor and to be connected through a transmission shaft to the power takeoff of said tractor.

The transmission shaft acts through various mechanical means to impart a rapid rotary movement to a rotor carrying hammers cooperating with plowshares to first crush the rocks encountered by the hammer on the ground and then crush the rocks lifted up by the plowshares.

It is also possible, with apparatus of this type, to crush rocks of large dimensions which are troublesome in agricultural ground into smaller rocks without producing rock dust. It is important, in effect, to avoid creation of this rock dust in arable ground, because this alters the pH value of the ground and requires the farmer to take steps to correct this change in the pH value of the soil.

A first embodiment of the rock crusher comprises a group of plowshares fixed to each other. This method of mounting may lead to defects in operation when the rock crusher encounters a large rock deeply anchored in the soil. When such a large rock is encountered, the plowshare which strikes it passes above the rock, but the entire group of plowshares is also lifted up so as to prevent the rotor carrying the hammers from functioning correctly over a substantial width of terrain. Moreover, the abrupt lifting of the assembly of plowshares may unbalance the rock crusher and cause an accident.

A second embodiment of the rock crusher according to the invention makes it possible to avoid the above disadvantages resulting from the fact that the plowshares are fixed to each other. This improved rock crusher comprises a support in which slidable claws replace the plowshares of the rock crusher described in the first embodiment. These claws are each pivotally attached at their upper end to one end of an independent claw arm. Each claw and arm thus constitute a retractable member capable of moving upward independently of the other members, said movement being limited by spring means individually associated with each claw.

The position of the entire group of claws with respect to the rotor of the rock crusher may be altered as a unit by a claw regulating member which is pivotable about an axis parallel to the axis of the rotor. This claw-regulating member also carries the claw arms and the spring means associated therewith.

The position of the claw regulating means may be modified by one or more adjusting rods. A smooth end of said adjusting rod is provided to rotate without longitudinal movement in a smooth transverse opening in a shaft which can pivot horizontally with respect to the frame of the rock crusher.

The other end of the adjusting rod, which is threaded, cooperates with a threaded transverse opening provided in a shaft which can pivot horizontally with respect to the claw regulating member of the rock crusher.

In an equivalent embodiment the shaft having the smooth opening is pivotally mounted in the claw regulating member and the shaft having the threaded opening is pivotally mounted in the frame of the rock crusher.

In order that the object of the invention may be better understood, two embodiments thereof will now be described, purely by way of illustration and example, with reference to the accompanying drawings on which:

Figure 1:
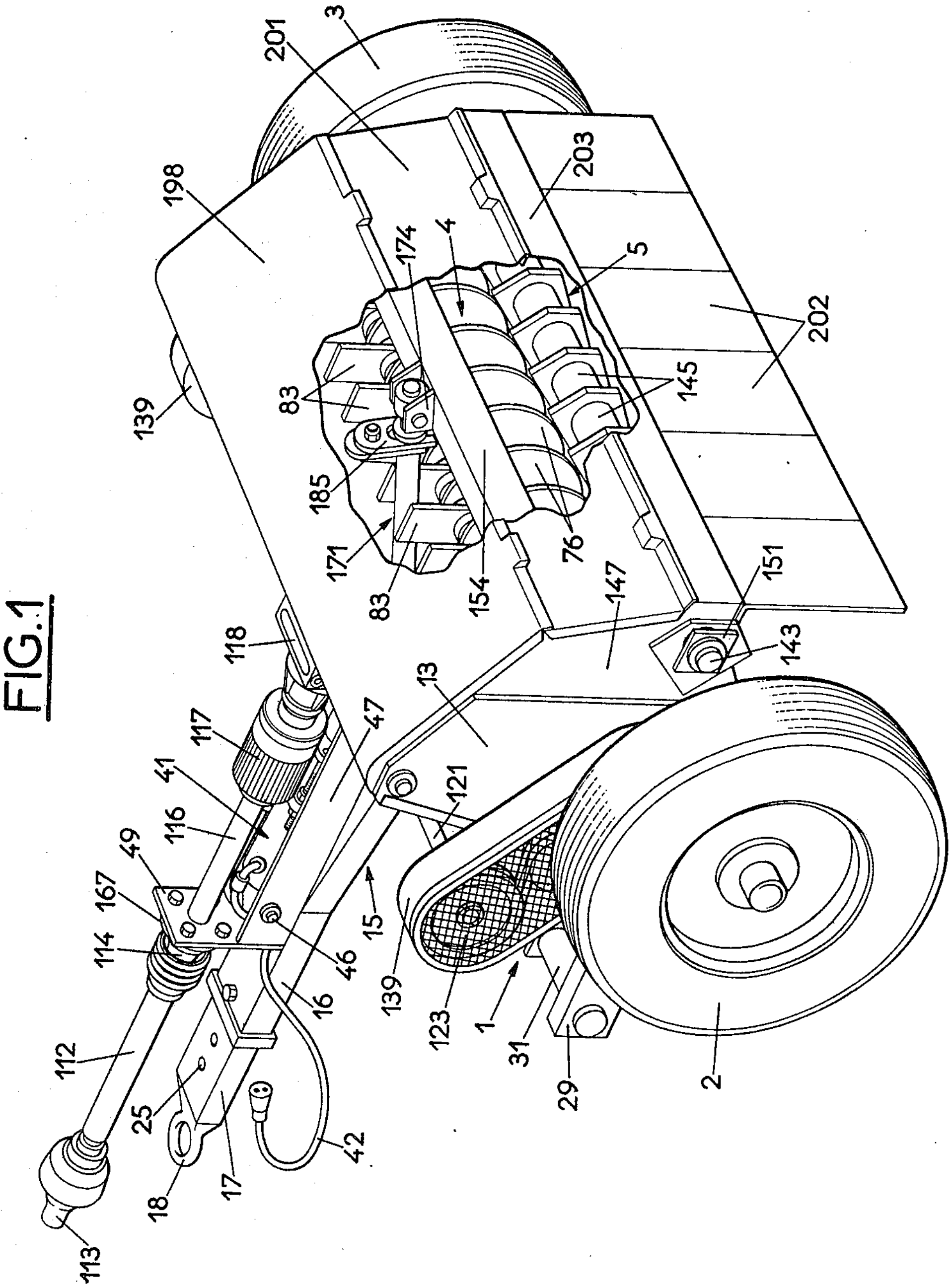
FIG. 1 is a perspective view of a first embodiment of the rock crusher according to the invention.

The rock crusher shown on FIG. 1 consists essentially of a frame 1 carried by two wheels 2, 3 and in which a rotor 4 and a plowshare assembly 5 is mounted.

Figure 4:
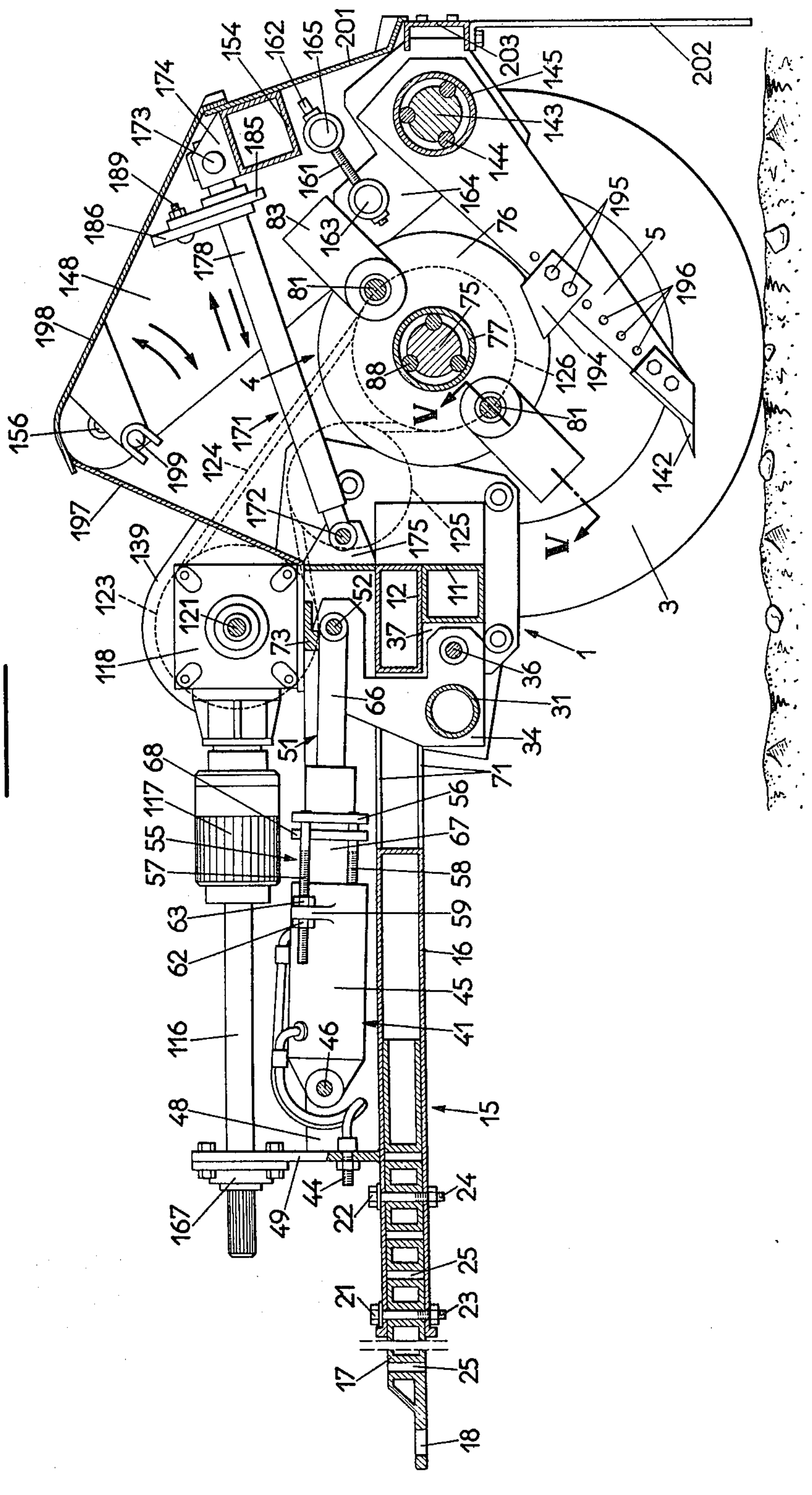
FIG. 4 is a vertical sectional view taken along the line IV—IV of FIG. 2.

The frame 1 (see also FIGS. 2 and 4) consists essentially of two transverse tubes 11 and 12, which are rectangular in section welded to each other. The ends of these tubes are welded to lateral plates 13, 14. On the central part of the tube 12 is mounted a telescopic tongue 15 formed of a tubular main member 16 inside which an auxiliary member 17 ending in an eye 18 is slidably mounted. This eye is adapted to engage the hook of the drawbar of the tractor.

The auxiliary member 17 may be immobilized in the main member 16 of the tongue at any longitudinal position desired by means of two screws 21, 22 engaged in two threaded holes 23, 24 of the main member 16 and at the same time in any two corresponding holes of a series of holes such as 25, distributed over the length of the auxiliary member 17.

The two wheels 2 and 3 are each mounted on a journal 28, at one end of an arm 29. The other ends of the two arms 29 are respectively fixed to the two ends of a transverse tube 31 which passes through two end plates 32, 33 (FIG. 2) and two central plates 34 (FIG. 4), to which it is welded. The plates 34 turn in an opening 71 in the main member 16 of the tongue. Plates 32, 33, 34, can pivot about a transverse horizontal axis 36 (FIG. 4) which is supported at its two ends in the lateral plates 13 and 14 of the frame, while it is supported midway of its length by an intermediate plate 37 attached to the transverse tubes 11 and 12.

The central plates 34 can be pivoted about the axle 36 and consequently cause the wheels 2 and 3 to rise or descend with respect to the frame 1 by means of a hydraulic jack 41, which may be operated by oil under pressure supplied through connectors such as 44 connected by flexible ducts 42 (FIG. 1) to an appropriate distributor mounted on the tractor. The cylinder 45 of the hydraulic jack 41 is pivotally attached by a pin 46 to two plates 47, 48 (FIGS. 2 and 4) welded both to the top of the main member 16 of the tongue 15 and to a front plate 49 which is also welded by its lower edge to the top of the tongue. The piston rod 51 of the hydraulic jack 41 is pivotally attached by a shaft 52 to the central plates 34. The hydraulic jack 41 is provided with a double stop system 55 which comprises an annular member 56 connected to the cylinder 45 of the jack by two diametrically opposed threaded rods 57, 58 threaded respectively into two bosses 59 on the cylinder and held in said bosses by the two nuts 62, 63. The piston rod 51 of the jack consists of a member 66 which is screwed into another member 67 carrying a small collar 68 which is movable between the annular member 56 and the corresponding end of the cylinder 45 of the jack.

By moving the nut 62, 63 on the threaded rods 57, 58, the position of the annular stop 56 with respect to the cylinder 45 of the jack, and consequently the stroke of the piston rod 51, may be regulated.

Moreover, by screwing the member 66 of the piston rod more or less deeply into the member 67, the position of the stroke of the jack may be regulated.

It is thus possible to regulate both the vertical stroke of the wheels 2, 3 of the machine with respect to the frame 1 and the position of this stroke.

A safety device 73 holds the machine in its uppermost position with respect to the wheels when traveling on the road, for example, or while the machine is detached and is not under the control of the hydraulic jack 41.

The rotor 4 consists essentially of a shaft 75 onto which are alternately threaded the circular discs 76 and the rings 77. All the discs 76 are traversed by rods 81 which, in this particular example, are two in number, and consequently diametrically opposed with respect to the shaft 75, and on which the hammers 83 are freely pivoted. These rods 81 are held by pins 82 supported by bolted plates.

The two ends of the shaft 75 are respectively supported in tubular bearings 86, 87 carried by the two lateral plates 13 and 14 of the frame 1. FIG. 3 shows, on a larger scale, the mounting of one end of the rotor. This shows the shaft 75, the first spacing ring 77 and the first disc 76 fixed to the shaft, as are all the other discs, by three cylindrical rods 88 forming keys between the tube and shaft. At each of its ends each rod 88 is held against axial movement by a pin 89 mounted radially in the shaft. The stack of circular discs 76 and tubular spacing rings 77 is gripped between two square bolts 91, 92 (see also FIG. 2) screwed onto a correspondingly threaded part 93 of the shaft and bearing against a washer 94 gripped against the outer surface of the corresponding end disc 76.

Each of the two bearings of the rotor, for example, the bearing 86, is mounted on the corresponding lateral plate of the frame, for example the plate 13, by means of screw 95 which serves at the same time to hold on a cover 96 for the bearing.

The corresponding end of the shaft is held in the bearing by a ball bearing or roller bearing 98.

Figure 5:
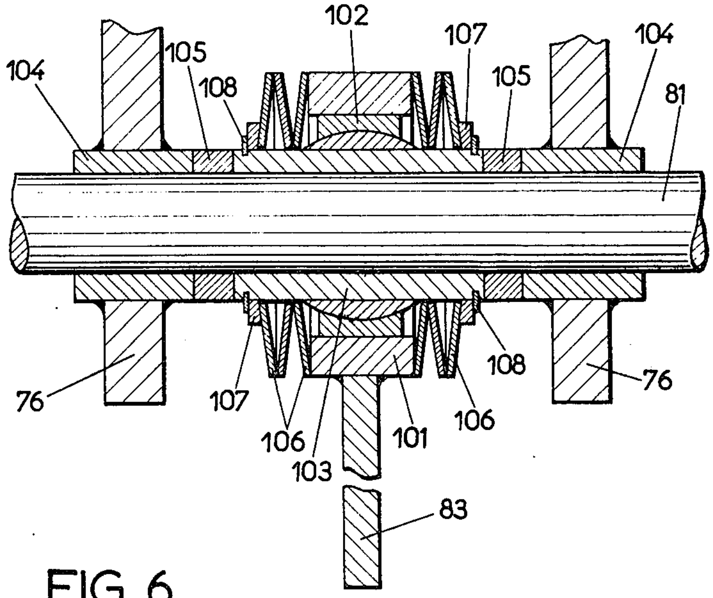
FIG. 5 is, on a larger scale, a partial section taken along the line V—V of FIG. 4.

FIG. 5 shows on a larger scale in detail the mounting of a hammer 83 on the corresponding rod 81 of the rotor. Each hammer 83 consists of a plate which is generally rectangular in shape, preferably of hard silicon steel, and is welded to a hub 101 fixed to the outer race of a roller bearing, which may be of the needle type and is indicated as a whole by reference numeral 102. The inner race of this bearing is mounted on a bushing 103 on the rod 81. The latter passes through the circular discs 76 of the rotor via the reinforcing hubs 104 of the discs. The sliding washers 105 are interposed between the hubs 104 and the corresponding ends of the bushings 103. BELLEVILLE washers 106, or helical springs, are interposed between the hub 101 of the hammer and the two flat washers 107 held on the two ends of the bushing 103 by welding or by means of flexible sealing rings 108 seated in corresponding annular necks in the bushing. As a consequence of this particular arrangement, the hammers can, when reacting from the rocks which they crush, incline slightly to one side or the other, but are then resiliently returned to their normal position with respect to the axis of the rotor.

The rotor 4 is driven from a power take-off mounted on the rear of the tractor to which the machine is attached, through a transmission which comprises a transmission shaft 112 with a double universal joint 113 and a single universal joint 114, intermediate shaft 116, a torque limiter 117, bevel gearing 118, two transverse shafts 121, 122 and two pulleys such as 123 (FIG. 4), over each of which passes a belt 124, which also passes over a tensioning roller 125, and over a pulley 126 fixed to the corresponding end of the shaft 75 of the rotor.

The front end of the shaft 116 is mounted in flange 167 supported by the plate 49, whereas its rear end is supported in the torque limiter 117. The bevel gearing 118 is mounted on the top of the frame 1 of the machine and the lower edges of the two transverse shafts 121,122 are connected to the output shafts 131,132 of the bevel gearing by two internally toothed couplings 133, 134 respectively, whereas their outer ends are supported in two bearings 135, 136 attached to the lateral plates 13 and 14 of the frame. The two belt transmissions are each covered by protective grillwork such as 139.

The plowshares 5 terminate in inserted blades 142 and are carried by a transverse shaft 143 in the same way as the circular discs 76 of the rotor shaft. That is to say, they are threaded on said shaft to which they are fastened by the pins 144 between shafts and the rings 145, this assembly being gripped between two plowshare carrying members 147,148 by means of two special square nuts 151, 152 screwed on the two ends of the shaft 143, which are threaded for this purpose. The two end members 147, 148 are attached to the two ends of a square cross tube 154 and can pivot about two pins 156 in two corresponding holes in the upper part of the lateral plates 13, 14 of the frame. The pins 156 are positioned above the rotor and a little in front thereof so that the plowshares have a tendency to withdraw from the soil more than to penetrate it when a safety device is released in response to excessive strain, as will be hereinafter seen.

The angular position of the plowshares 5 on the shaft 143 which carries them may be adjusted by means of a system which comprises adjacent the inner face of each of the two plowshare-carrying members 148,149 a threaded rod 161 provided with a square control head 162 and engaged in a socket 163 in a plate 164 fixed to the corresponding end of the shaft 143. A smooth part of said threaded rod is also engaged in another socket 165 mounted on the corresponding plowshare-carrying member. When turning these two threaded rods to effect regulation it is obviously necessary that the two nuts 151 and 152 be unscrewed.

The plowshare-carrying members 147, 148 are held in position by a drawbar 171, the two ends of which are respectively attached to the frame 1 by pin 172 in a flange 175 and to the tubular transverse member 154 by protuburances 173 which are seated in the two arms of a flange 174 welded to the upper surface of the cross tube 154.

Figure 6:
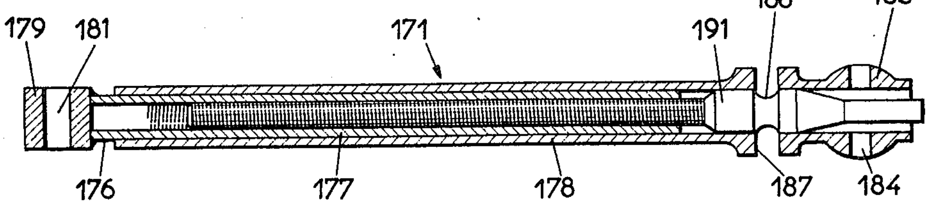
FIG. 6 shows the drawbar in longitudinal section.

The drawbar 171 is telescopic and comprises a first assembly including a tubular member 176 (FIG. 6) in which is mounted a threaded rod 177, said assembly being slidable in a tubular outer member 178. One end of the member 176 has a head 179 pierced by a transverse hole 181 in which the shaft 172 is lodged. The tubular outer member 178 is provided with a head 183 pierced by two holes 184 which receive the projections 173.

The drawbar 171 serves to limit the applied force, and for this purpose the tubular members 178 is longitudinally connected to the lower rod 177 by a resilient yoke 185 (FIG. 1) the transverse part of which is attached by a bolt 189 to a plate 186 welded to the tubular member 178 and the two parallel arms of which are simultaneously engaged in two parallel grooves 187 (FIG. 6) which extend laterally into said member, as well as an annular neck 188 formed in a head 191 of the threaded rod 177.

When an excessive force is applied to the plowshares 5 in the course of work, the two arms of the yoke 185 spread resiliently in response to the pressure exerted by the rounded bottom of the annular neck 188 so that the drawbar assembly 171 elongates.

Against the two faces of each plowshare 5 are positioned the two stops 194 for adjusting the position of the plowshare as a consequence of their attachment by two bolts 195 which pass through two holes in the said stops and are engaged in two corresponding holes in a series of holes 196 aligned along the length of the upper edge of the plowshare.

These stops have an upper surface which is oblique with respect to the upper surface of the plowshare and are located a little in front of the point on the plowshare which is closest to the circular discs of the rotor. They serve to prevent the rocks from becoming squeezed between the discs and the plowshares.

The machine is provided with protectors around both the rotor and the belts which drive it. These protectors consist of a sheet 197 fixed to the upper part of the frame, an upper sheet 198 pivotally mounted on two lateral pivots 199, rear sheet 201 hooked to the cross tube 154, and vertical rubber flaps 202 attached to a rear cross bar 203 attached at its two ends to the lower part of the plowshare-carrying member 147, 148. The two belt transmissions are surrounded by grill-work protectors 139. All these protectors are easily removable to permit convenient repair of the engine.

The rock crusher operates as follows: One begins by lightening the soil and reducing the differences in level. The humidity of the soil must be low so as to avoid adherence of the ground to the rocks, which would materially reduce the impact of the hammers on the rock.

By means of the hydraulic jack 41 the height of the wheels is so regulated that the hammers 83 skim the surface of the soil or penetrate slightly thereinto. When this position is reached, the double stop 55 is so adjusted as to be able to raise or lower the machine without hesitation by maintaining the initial adjustment which, for practical purposes, does not need to be changed. The plowshares 5 are then adjusted and this step is begun by unscrewing the two locking nuts 151, 152. Then by means of screws 161, the tips of the plowshares 152 may be raised or lowered to bring them to the desired depth. In any case, a minimum space of the order of 10 mm is always left between the upper edges of the plowshares 5 and the periphery of the circular discs 76 of the rotor. A check is made to be sure that the stops 194 of the plowshares are correctly positioned. The two end nuts 151,152 are then tightened. The tongue is hooked to the tractor, the mechanical transmissions and the hydraulic transmissions are connected, and the machine is ready for use.

The rotor is driven from the power take-off at a speed of the order of 1,000 rpm and the hammers, in responce to centrifugal force, are radially displaced with respect to the rotor. As the tractor advances, the machine is lowered by actuating the hydraulic jack. The hammers first crush the rocks which they encounter on the soil, and then those which the plowshares have raised. When the machine reaches the end of the terrain the pressure in the hydraulic jack is progressively increased so as to lower the wheels and consequently raise the rotor, which is then disengaged to permit the machine in turn. For travel along the road the machine is obviously kept in its raised position and preferably the latching device 73 is kept in place for safety reasons.

When, in response to an excessive force during work, the drawbar is elongated, it suffices to raise the machine to its upper position to permit the assembly of the plowshares and their supports to return to their original working position, while returning the drawbar to its initial length.

Figure 7:
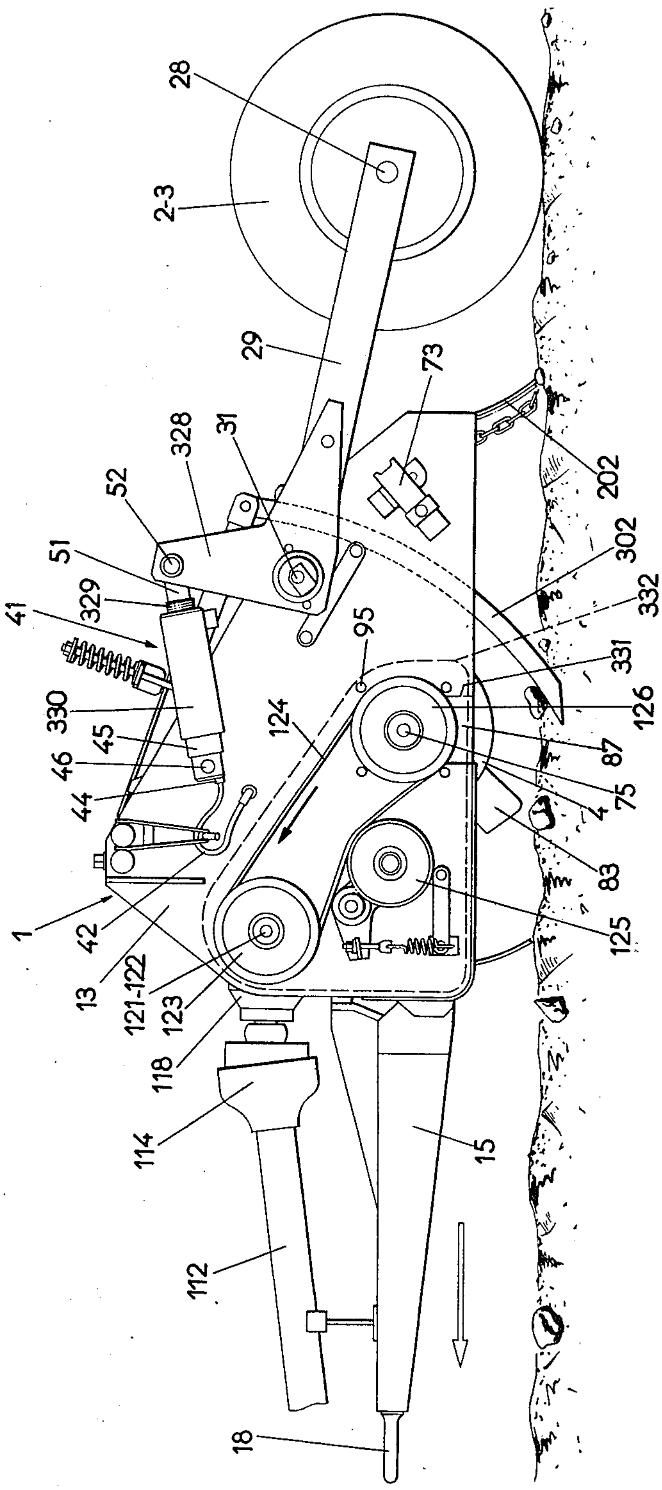
FIG. 7 is a side view of a second embodiment of the rock crusher according to the invention after removal of the protective casing for the rotor-driving means.
Figure 8:
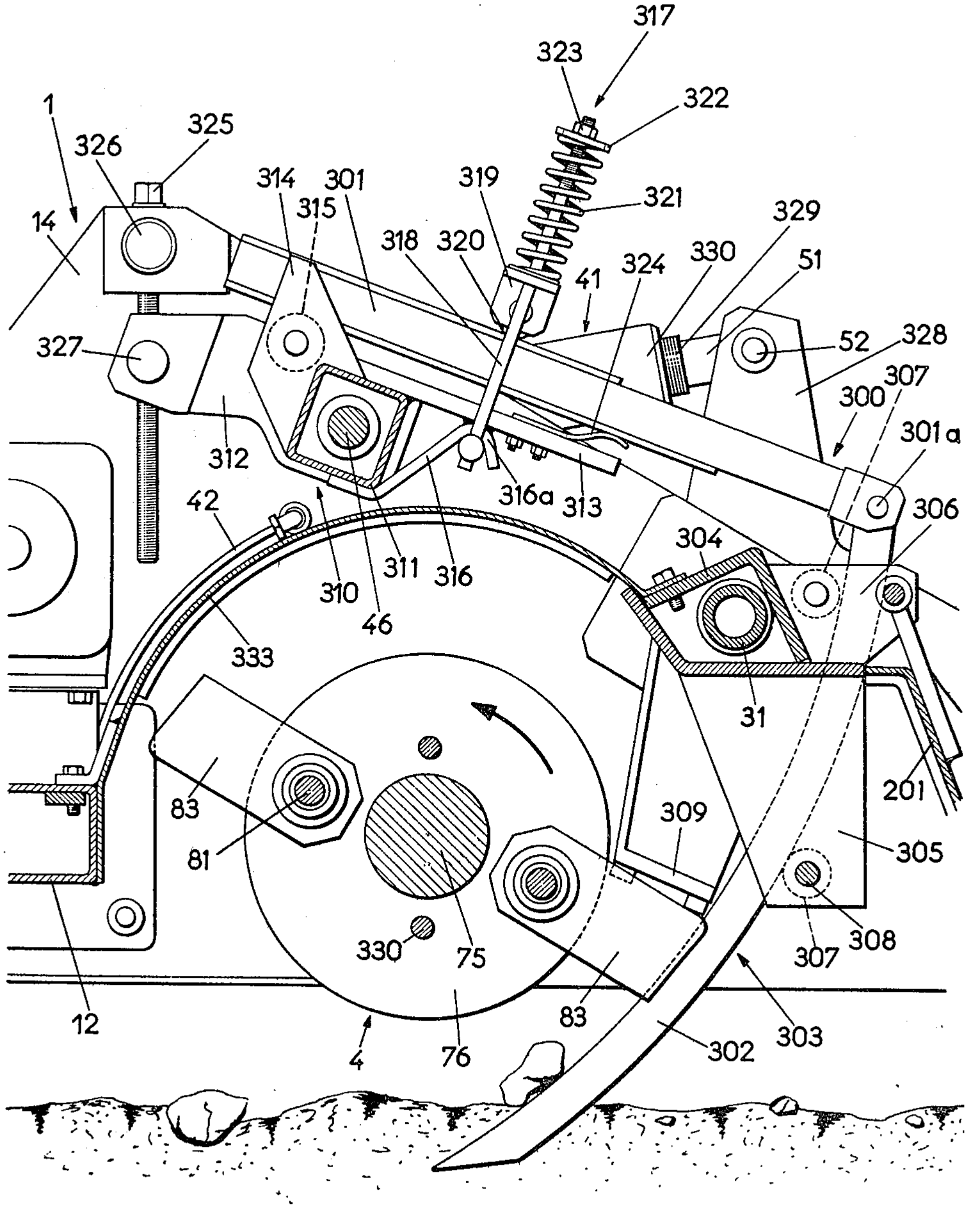
FIG. 8 is a side view on an enlarged scale of the central part of the rock crusher of FIG. 7, with the front part broken away to show the internal components of the rock crusher.

In the embodiment of the rock crusher described in FIGS. 7 and 8 components similar to those of the rock crusher described in connection with the previous figures have been assigned the same reference numerals.

The rock crusher according to the second embodiment of the invention thus also comprises a frame 1 carried by two wheels 2 and 3, and on which frame is supported a rotor 4. The frame 1 also comprises a transverse tubular member 12 having a rectangular section, to the ends of which are welded to lateral plates 13 and 14. The central part of the tube 12 also carries a tongue 15 comprising a mechanically welded member terminating in an eye 18.

The two wheels 2 and 3 are likewise mounted on journals 28 attached to one end of an arm 29, the other end being mounted to pivot around an axis 31 passing through the front plates 13 and 14.

To lower the frame 1 into working position the arm 29 carrying the wheels 2 and 3 is pivoted by means of two fluid-actuated jacks 41 connected by flexible ducts 42 through connections 44 to a suitable distributor on the tractor. The fluid-actuated jack 41 comprises a cylinder 45 mounted to pivot about a shaft 46 with respect to a plate 13 or 14. The fluid-actuated jack comprises a rod 51, the end of which cooperates with a shaft 52 to raise and lower the wheels 2 and 3.

The latch 73 for holding the plowshares in raised position is also adapted for use when the machine is traveling along the road or when the jack 41 is not supplied with pressure fluid, as when the rock crusher has been detached from the tractor.

The rotor 4 consists essentially of a shaft 75 to which the discs 76 are welded. The discs 76 carry hammers 83 mounted to rotate around the rods 81.

The shaft 75 is supported by two bearing assemblies 87 bolted on the lateral plates 13 and 14 by bolts 95.

In the second embodiment, which has just been described, the rotor 4 is driven from a power take-off on the rear end of the tractor to which the machine is attached through a transmission which comprises a transmission shaft 112, universal joint 114, bevel gearing 118 and two transverse shafts 121 and 122, each carrying at its end a pulley 123. Two belts 124 tensioned by two tension rollers 125 pass over the pulleys 123 and 126, which pulleys 126 are fixed to the ends of the shaft 75 of the rotor 4.

There is also a rear protective sheet 201 fastened to the frame 1 of the rock crusher and rubber flaps 202 which come in contact with the ground when the machine is in working position.

The plowshares 5 are replaced by hooks 300. A hook-supporting arm 301 consisting of a metallic rod carrying welded reinforcements is connected at its end 301*a* to a hook 302 formed from a square section of silicon steel which has been formed into a part-circular arc and is pointed at its lower end. The hooks 302 slide inside a member 303 made of thick sheet metal welded onto a transverse trapezoidal member 304 which contains the shaft 31.

Pairs of lower guide jaws 305 are welded to the lower part of the transverse member 304 and pairs of upper guide jaws 306 are welded to the upper and rear part of the transverse member 304. A roller 307 is positioned between a pair of lower guide members 305 behind the hook 302. In like manner, between the upper guide members 306 of the same pair, and in front of the hook 302, is another roller 307. Rods 308 which pass completely through the member 303 from axles for the rollers 307. The rollers 307 and the pairs of guide members 305 and 306 guide the hooks 302.

Stops 309 made of sheet metal welded to the front lower part of the transverse member 304 are positioned above each of the hooks 302.

Figure 2:
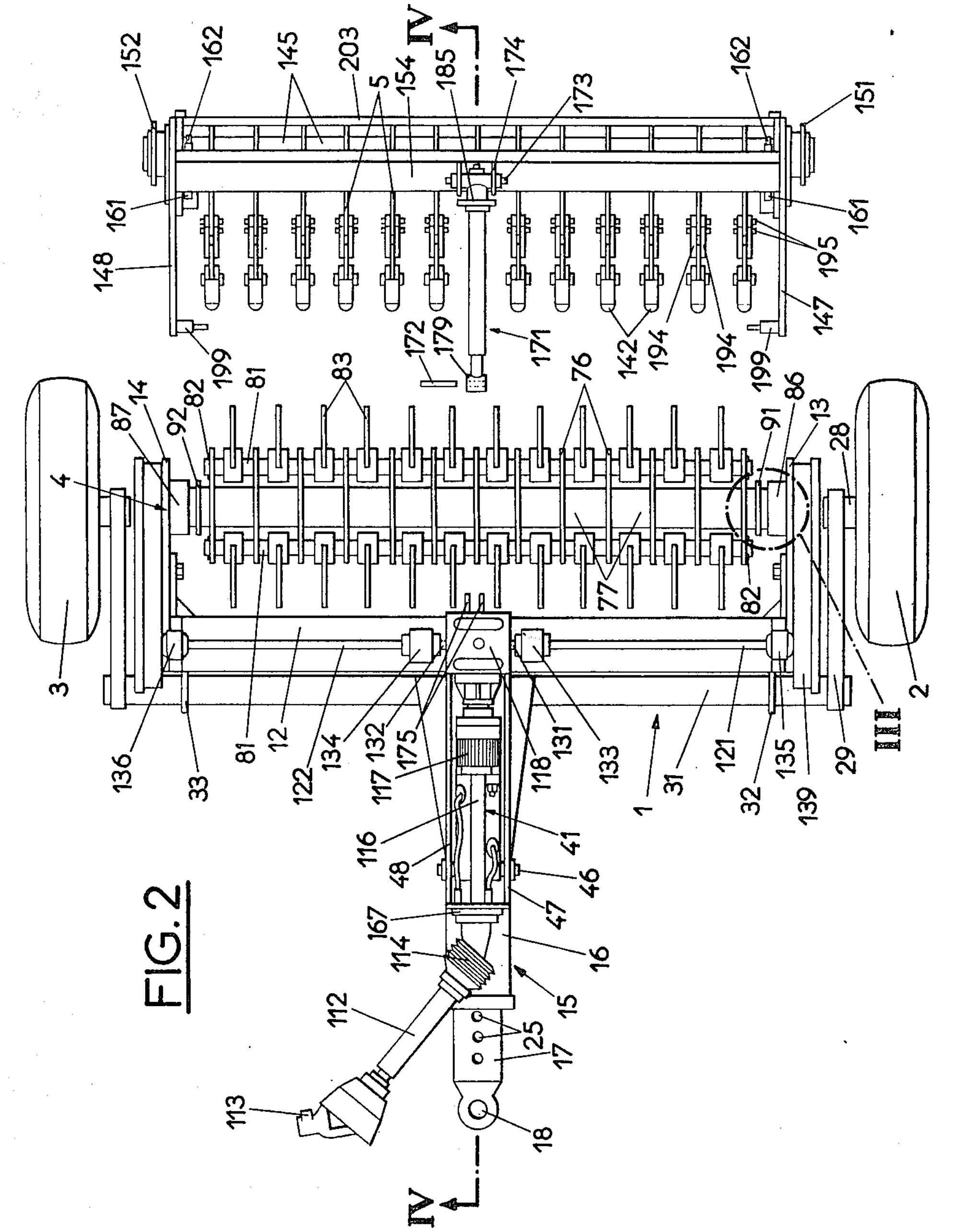
FIG. 2 is a partial plan view on a larger scale of the apparatus shown on FIG. 1, the group of plowshares being shown separate from the rest of the device for the sake of clarity in illustration.
Figure 3:
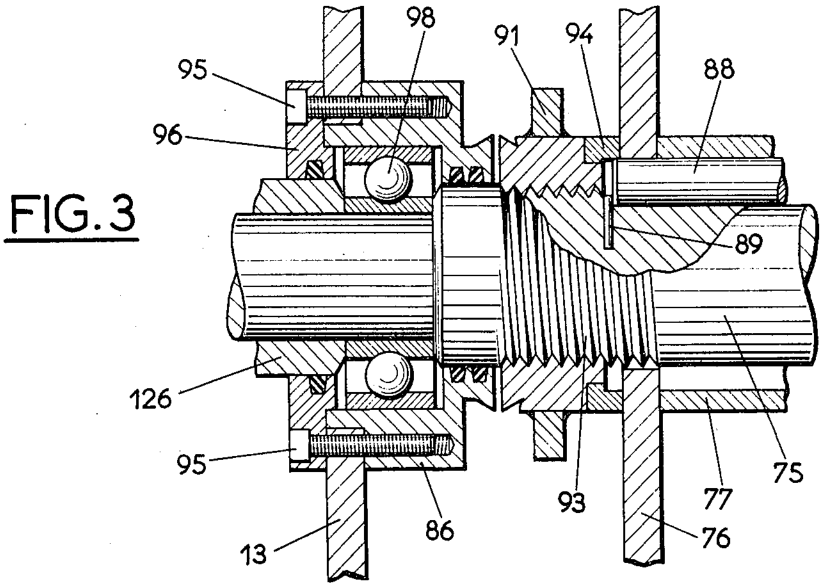
FIG. 3 shows in section on a larger scale the detail enclosed in the circle formed by the broken lines indicated by III in FIG. 2.

It may be seen from FIG. 2 that the hammers 83 turn in the spaces between two consecutive assemblies, each formed by a hook 302 and the stop 309 superposed on the hook 302.

A hook adjusting member 310 is constructed around a square transverse member 311 which is rotatable about the shaft 46 which passes through the lateral plates 12 and 13. Two regulating levers 312 are welded onto the square transverse member 311. Arm supports 313 for each of the claws 300 are also welded on the transverse member 311.

Guide plates 314 are also welded in pairs on the square transverse member 311 and carry rollers 315 adapted to support the upper ends of the claw arms 301.

Flat sheets 316 are welded to the square transverse member 311 and to a support for the arm supports 313 at 316*a*, said end 316*a* serving as an abutment for a rider 318.

Said rider 318 holds a claw arm 301, passes through a support 319 containing a roller 320 adapted to come in contact with said claw arm 301, and then passes through two helical springs 321 and a gripping plate 322.

The nuts 323 at the two ends of the rider 318 serve to compress the springs 321, which has the effect of bringing a support for the claw arm 313 toward the claw arm 301 already engaging the roller 315.

A leaf spring 324 is positioned between the claw arm 301 and the support for the claw arm 313.

The adjusting member for the claws 310 is adjusted by means of two rods 325 positioned at the level of the lateral plates 13 and 14 of the frame 1 of the rock crusher.

A shaft 326, which can turn horizontally with respect to the frame of the rock crusher, has a smooth transverse opening in which the smooth end of a regulating rod 325 can turn without longitudinal displacement. A shaft 327 can turn horizontally with respect to the regulating lever 312 and has a threaded part which cooperates with the threads of the lower threaded part of the regulating rod 325. By turning the regulating rods 325 the regulating levers 312 and the regulating members for the claws 310 are swung around the axle 46 so as to depress the hook 302 of the claw more or less deeply into the ground.

When in working position, the hammers 83, first crush the rocks at the surface of the ground and then the rocks brought up by the hooks 302 which were sunk slightly into the ground. The upward movement of the rocks brought up by the hooks is limited by the stops 309 positioned above each of the hooks 302.

When a hook 302 encounters a large rock deeply anchored in the ground, only the hook 302 is forced upward. It rises, guided by the roller 307, while angularly displacing the claw arm 301 which rests on the roller 315 and compresses the springs 321. When the obstacle is free, the hook 302 returns to its initial position in response to the returning force of the springs 321 on the arm 301.

The device described in the first embodiment for raising and lowering the framework 1 has in this case been revised. It may be noted that the arm 29 is welded on an angle member 328 which pivots about the shaft 31 and carries the shaft 52 supporting the rod 51 of the fluid actuated jack 41.

Said rod 51 has a threaded part 329 cooperating with a cylindrical member 330 the bottom of which serves as a stop for the cylinder 45 of the fluid actuated jack 41, and thus limits the path of travel of the rod 51. In this manner it is possible to regulate the height of the rotor 4 with respect to the ground in dependence upon the working conditions.

The rotor 4 also carries two shock absorbers 330 on opposite sides of the assembly of discs 76 so as to avoid impact of the hammers 83 on the shaft 75.

The openings 331 formed in the lateral plates 13 and 14 permit the removal of the rotor by dropping it downward after having unscrewed the screw 95 fastening the bearings 87 and 88 to the lateral plates 13 and 14.

Closed protective casings 332 for the means for driving the rotor are mounted on each side of the frame 1 of the stone crusher.

The hammers are thin but heavy, so as to insure a substantial impact pressure and consequently an enormous stress on the rock, so that it fractures while producing very little dust, and thus without increasing the pH of the soil.

Moreover, the hammers are covered by a deposit of extremely hard metal on the working surface and have a certain freedom of lateral movement under control of the Belleville washers, or other elastic means, such as springs or rubber washers, so that they have substantial durability.

It will, of course, be appreciated that the embodiments which have just been described may be modified as to detail and that certain components thereof may be replaced by their mechanical equivalents without thereby departing from the basic principles of the invention.

What is claimed is:

1. Rock crusher comprising a frame adjustably supported upon a plurality of wheels, a drawbar for connecting said frame to a tractor, a row of plowshares extending transversely of said frame, with the individual plowshares extending in a direction having a substantial vertical component, a rotor rotatably mounted in said frame substantially parallel to said row of plowshares and on the same side of said plowshares as said drawbar, a plurality of hammers each pivotally attached at one end thereof to a point on the circumferential periphery of said rotor between said plowshares so that said hammers may swing freely about said points and the other ends of said hammers are urged radially outward to points between the lower ends of said plowshares by centrifugal force when said rotor turns, drive means for said rotor adapted to be connected to the power take-off of a tractor.

said rotor comprising a shaft which carries a series of circular discs separated by spacer rings, said discs being pierced near their peripheries by rods to at least one of which said hammers are pivotally connected between said discs, and said hammers are thick plates which are generally rectangular in shape and mounted for limited axial movement along the rod to which they are connected between two resilient members, and said plowshares carrying stops which are adjustable along the plowshares and adapted to prevent the rocks from becoming squeezed between the discs of the rotor and the plowshares.

2. Rock crusher comprising a frame adjustably supported upon a plurality of wheels, a drawbar for connecting said frame to a tractor, a row of plowshares extending transversely of said frame, a rotor rotatably mounted in said frame substantially parallel to said row of plowshares, a plurality of hammers each pivotally attached at one end to a point on said rotor between said plowshares and mounted to swing freely about said point so that its other end is urged outwardly by centrifugal force to a position between the lower ends of two of said plowshares during part of each rotation of said rotor and drive means for said rotor adapted to be connected to the power take-off of a tractor, said plowshares being attached to a transverse bar, the ends of which are supported by two end members which are spaced by said transverse bar and pivotally mounted in two lateral plates on the frame by means of coaxial pivots positioned above and in front of the rotor, and said end members being connected to the frame through said transverse bar and a drawbar, said drawbar comprising an inner part, slidable inside an outer part, said outer part being provided with a resilient yoke having two parallel arms positioned in a plane perpendicular to the direction of said drawbar and engaged in two parallel grooves opening in said outer part and in an annular neck in said inner part, and said parallel arms having a resilience such that they spread apart to permit relative sliding movement between said inner and outer part when excessive tension is applied to said drawbar.

3. Rock crusher as claimed in claim 2 in which the outer part carries attaching means which passes through an elongated hole in an extension of the inner part to limit the amplitude of relative sliding movement of the two parts.

4. Rock crusher as claimed in claim 2 in which the inner part comprises a threaded rod engaged in the threaded bore of a tubular member so that the drawbar is adjustable in length.

5. Rock crusher comprising a frame adjustably supported upon a plurality of wheels, a drawbar for connecting said frame to a tractor, a row of plowshares extending transversely of said frame, with the individual plowshares extending in a direction having a substantial vertical component, a rotor rotatably mounted in said frame substantially parallel to said row of plowshares and on the same side of said plowshares as said drawbar, a plurality of hammers each pivotally attached at one end thereof to a point on the circumferential periphery of said rotor between said plowshares so that said hammers may swing freely about said points and the other ends of said hammers are urged radially outward to points between the lower ends of said plowshares by centrifugal force when said rotor turns, said plowshares being claws which are independently retractable, each claw consisting of an arm and a hook attached to one end of the arm, and separate spring means for each of the claw arms connected to urge each claw independently downward, said claw arms being mounted in a claw adjusting unit, said claws being retained in said unit by spring means, and said adjusting unit being mounted to swing about a shaft on the frame of the rock crusher to change the average position of the claws with respect to the rock crusher, and at least one adjusting rod cooperating with two shafts mounted to pivot horizontally, one with respect to the frame of the stone crusher and the other with respect to a regulating lever of said claw adjusting unit, said adjusting rod having a smooth end cooperating with a smooth transverse opening in one of said two shafts and a threaded end cooperating for regulating purposes with a transverse, threaded opening in the second shaft.

6. Rock crusher as claimed in claim 5 in which the spring means comprises a slider which bears on one part of the claw adjusting unit, which slider grips a claw arm, passes through a support containing a roller for contacting the claw arm, passes through two helical springs and a gripping plate, and is bolted at its free end.

7. Rock crusher comprising a frame adjustably supported upon a plurality of wheels, a drawbar for connecting said frame to a tractor, a row of plowshares extending transversely of said frame, with the individual plowshares extending in a direction having a substantial vertical component, a rotor rotatably mounted in said frame substantially parallel to said row of plowshares and on the same side of said plowshares as said drawbar, a plurality of hammers each pivotally attached at one end thereof to a point on the circumferential periphery of said rotor between said plowshares so that said hammers may swing freely about said points and the other ends of said hammers are urged radially outward to points between the lower ends of said plowshares by centrifugal force when said rotor turns, said plowshares being claws which are independently retractable, each claw consisting of an arm and a hook attached to one end of the arm, and separate spring means for each of the claw arms connected to urge each claw independently downward, and said claw arms and claws being pivotally attached and the claws being guided in a guide block constructed around a transverse member of the frame, said guide block comprising a pair of upper and a pair of lower guide jaws for each claw, a roller being positioned between the upper guide jaws of a pair in front of the claw and another roller being positioned between the lower guide jaws of the same pair in back of the claw.

3. Rock crusher comprising a frame adjustably supported upon a plurality of wheels, a drawbar for connecting said frame to a tractor, a row of plowshares extending transversely of said frame, with the individual plowshares extending in a direction having a substantial vertical component, a rotor rotatably mounted in said frame substantially parallel to said row of plowshares and on the same side of said plowshares as said drawbar, a plurality of hammers each pivotally attached at one end thereof to a point on the circumferential periphery of said rotor between said plowshares so that said hammers may swing freely about said points and the other ends of said hammers are urged radially outward to points between the lower ends of said plowshares by centrifugal force when said rotor turns, drive means for said rotor adapted to be connected to the power take-off of a tractor, two wheels, each carried by a journal carried by an arm welded to a crank, said crank being pivotable about a shaft in the frame of the rock crusher in response to the actuation of a fluid actuated jack mounted between said frame and said crank, and a cylindrical member cooperating with a threaded part of the piston rod of the jack to serve as an abutment for the cylinder of the jack to limit the stroke of the piston rod of the jack and thus regulate the height of the rotor of the rock crusher with respect to the ground.

* * * * *